July 11, 1950  J. M. LEATHERMAN  2,514,880
ADJUSTABLE FRAME HACKSAW
Filed June 23, 1947

INVENTOR
JERRY M. LEATHERMAN
BY
ATTORNEYS

Patented July 11, 1950

2,514,880

UNITED STATES PATENT OFFICE 2,514,880

ADJUSTABLE FRAME HACKSAW

Jerry M. Leatherman, Akron, Ohio

Application June 23, 1947, Serial No. 756,413

6 Claims. (Cl. 145—34)

This invention relates to hack saws, and more especially it relates to hack saws capable of adjustment between the relative positions of the hack saw blade and frame to adapt the saw to different kinds of work.

The chief objects of the invention are to provide a hack saw of the character mentioned that has relatively few parts; that is capable of adjustment easily and quickly; that may have its blade adjusted to an infinite number of angular positions with relation to the frame; that automatically is locked in all positions of adjustment; and which may be adjusted anywhere from one extreme position to the other without disassembling the elements of the hack saw structure. Other objects will be manifest as the description proceeds.

Figure 1:
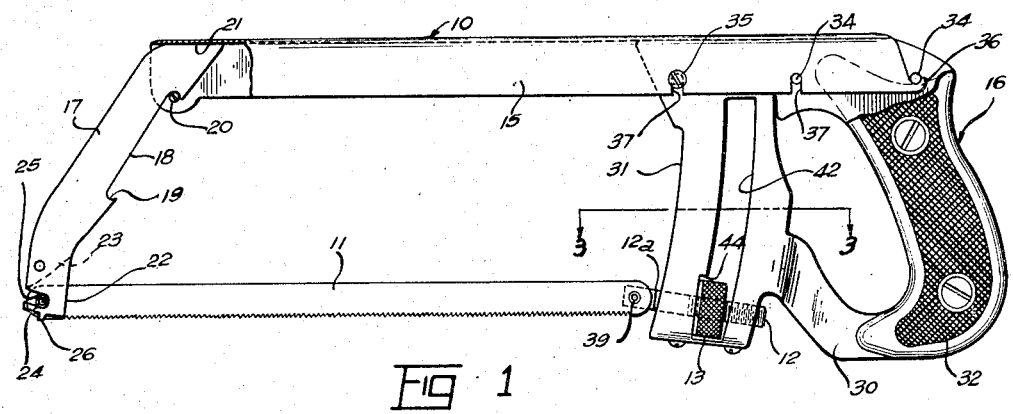
Fig. 1 is a side elevation of a hack saw embodying the invention in one position of adjustment, parts thereof being broken away to reveal underlying structure.
Figure 2:
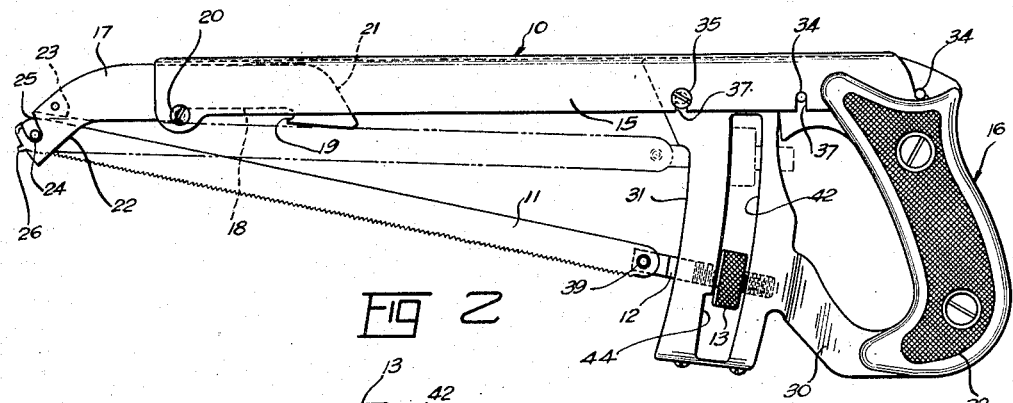
Fig. 2 is a view similar to Fig. 1 showing the hack saw in another position of adjustment.
Figure 3:
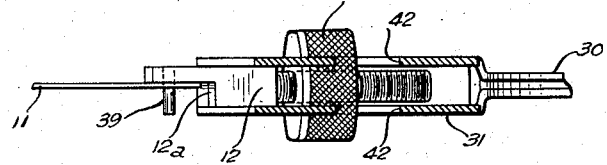
Fig. 3 is a section on the line 3—3 of Fig. 1.

Referring first to Figs. 1 to 3 of the drawing, there is shown a hack saw consisting of a frame that is designated as a whole by the numeral 10, a blade 11, and a blade-tensioning device consisting of a threaded stem 12 and a thumb-nut 13 threaded thereon.

The frame 10 comprises a channel-shaped back 15 at the rear (right) end of which is mounted a handle structure designated as a whole by the numeral 16, the other (front) end of back 15 carrying an arm or blade holder 17, said handle and blade holder being adjustably connected to said frame. The arm 17 is a flat plate that fits within the channel of the back 15 and projects from the forward end of the latter. The bottom margin of arm 17 is formed with a shallow elongate recess 18 having hook-shaped formations 19 at opposite ends thereof, said recess being located relatively near the rear end of said arm. A screw 20 carried by the back 15 at the forward end thereof extends across the channel of said back, said screw being received within the recess 18 of the arm 17. The arrangement is such that the arm 17 may be adjusted longitudinally of the back 15, the respective hook formations 19 engaging the screw 20 alternatively as the arm is in the position shown in Fig. 1 or in the position shown in Fig. 2. The rear margin 21 of the arm 17 is obliquely disposed so that the arm 17 is disposed obliquely with relation to the back 15 when the rear formation 19 engages screw 20, as shown in Fig. 1. The arm 17 is disposed substantially parallel to back 15 when the front formation 19 engages screw 20, as shown in Fig. 2. The forward end portion of arm 17 is disposed at an angle to the remainder thereof and contitutes a nose 22 to which one end of the blade 11 is releasably connected in any usual or desired manner. As shown, the nose 22 is slotted in its own plane at 23, the blade 11 being received in said slot and secured by a pin 24 that extends through the usual aperture in the end of the blade, said pin being received in an open-end recess 25 in said nose. A stud 26 projecting from the end of nose 22 also may be employed for attaching one end of the blade 11, in which case the plane of the blade will be at right angles to the plane of the blade as shown herein.

The handle structure 16 is composed chiefly of metal and comprises a hand-grip portion designated as a whole by the numeral 30, and a hand guard portion designated as a whole by the numeral 31. The metal of the handle structure is laminated, and consists of three plies in the hand-grip portion 30 and adjacent region, and two plies in the hand guard portion 31. The plies in the latter region are spaced apart from each other as is clearly shown in Fig. 3, and in other parts of the structure are welded, riveted, or otherwise united with each other. The region of the hand-grip portion 30 that is to be gripped by the hand is provided on opposite sides thereof with facing plates 32 of molded plastic material. The upper marginal portion of the handle structure is received within the channel of the back 15, at the rear end thereof. For securing it in said channel, said handle structure is provided with two laterally projecting studs 34, 34, and a projecting cap screw 35, which studs and cap screw are equi-distantly spaced apart. The back 15 is formed at its rear end with an upwardly open hook formation 36, and the lower margin of its channel is formed with two upwardly extending slots 37, 37. As shown in Figs. 1 and 2 of the drawing, the rear stud 34 is received in the hook formation 36 of the back, the front stud 34 is received in rear slot 37, and cap screw 35 is received in front slot 37. When screw 35 is tightened, the back 15 and hand-grip structure 16 are securely held in assembled relation. When desired, the hand-grip structure may be mounted in the back with its front stud 34 engaged with hook formation 36 and its cap-screw 35 received in rear slot 37, which arrangement will enable the frame to receive a blade 11 of greater length than that shown; for example, if the blade shown in the drawing is 10 inches long, the alternative arrangement described may enable the frame to receive a 12-inch blade.

As previously stated, the metal plates that compose the hand guard portion 31 of the handle 16 are spaced apart from each other, and the stem 12, to which the rear end of blade 11 is attached, is received in said space. As is best shown in Fig. 3, the front end portion of the stem 12 is square in transverse section and engages the opposite walls of the space in which it is received, the arrangement being such as to prevent the stem from turning on its longitudinal axis. The front end of the stem 12 also is reduced in thickness exteriorly of the guard portion 31, as shown at 12a, Fig. 3, and carries a laterally projecting stud 39 that is receivable in the aperture in the rear end of blade 11.

The hand guard portion 31 is arcuately slotted at 42 in the respective plates thereof, said slots being aligned transversely of the guard. The thumb-nut 13 on the threaded portion of stem 12 is located between the front and rear margins of slots 42, and projects through the slots, on opposite sides of the hand guard so as to be accessible for easy manipulation. When the thumb-nut is set up on the stem 12 to draw the blade 11 taut, said thumb-nut bears against the front margin of the respective slots 42. By loosening the thumb-nut, the latter and the stem 12 may be adjusted to different positions with relation to the slots 42 to vary the proximity and angular position of the blade 11 with relation to the back 15, as indicated by the full line and broken line showing of the blade in Fig. 2. Such adjustment of the blade does not require its removal from the frame, said blade moving angularly about its anchoring pin 24 at the front end of the structure.

A salient feature of the invention is the fact that the axis of the arcuate slots 42 is not coincident with the anchoring pin 24, when the arm 17 is in either of its alternative positions shown in Fig. 1 and Fig. 2, but is located in space beyond the left end of the back 15, substantially in alignment with the lower margin thereof. Thus the radius of the front margins of slot 42 not only is larger than the radius described by the nut 13 when the blade 11 is moved angularly about the pin 24 as an axis, but is eccentric with relation thereto; the arrangement is such that the thumb-nut 13 is farther from the pin 24 in the broken line position shown in Fig. 2 than it is in the full line position of the same figure. This feature of the invention is utilized as an extremely simple means for locking the thumb-nut 13 in any position of blade-adjustment since operating pressure upon the blade 11, which urges the nut 13 upwardly, serves only to wedge said nut more tightly against the front margins of slot 42. Furthermore the radius of the front margins of slot 42 is of such extent and so disposed that the conditions described obtain also when the handle structure 16 is so positioned on the back 15 that a blade 11 of longer length than that shown is employed. If desired, the front margins of slot 42 may be formed, at their lower extremity, with a recess or notch 44 in which the thumb-nut 13 is received when the blade 11 is at one extremity of its adjustable range, as shown in Fig. 1, but the presence of said notch is not essential to the functioning of the device.

When the elements of the invention are arranged in the relative positions shown in Fig. 1, the device will operate as a conventional hack saw, and angular adjustment of the blade 11 will not be required. However, on special work where space is at a premium, the hack saw readily is altered to the extent necessary to meet the exigencies of the situation. By loosening of the thumb-nut 13, the blade 11 quickly may be detached from front anchor pin 24, thus enabling the arm 17 to be shifted from the position shown in Fig. 1 to the position shown in Fig. 2. After the blade again is attached to pin 24, the nut 13 again is tightened to draw the blade taut, the position of said nut determining the angular relation of the blade 11 to the back 15. It will be observed that the pin 24 is substantially the same distance from slot 42 in both positions of adjustment of the arm 17. Thus the blade may be positioned substantially parallel to the back in close proximity thereto, as indicated by broken lines in Fig. 2, with the nut 13 at the upper end of slot 42, or the blade may be disposed at a substantial angle to the back 15, which angle is greatest when the nut 13 is in notch 44 at the lower extremity of slot 42. Other angular positions of the blade are effected by positioning the thumb-nut intermediate the two extreme positions mentioned, said nut retaining its selected position because of the wedging effect of the nut against the margin of slot 42 as the result of operating pressure on the blade 11, which pressure is upwardly directed in the plane of said blade.

The invention provides a hack saw structure of relatively few parts, that may be used in the conventional manner, which quickly and easily may be adjusted for special work without disassembling of the various elements of the device, and which achieves the other advantages set out in the foregoing statement of objects.

Figure 4:
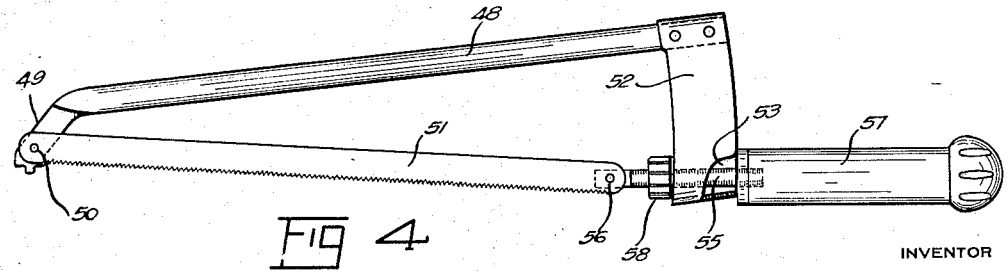
Fig. 4 is a side elevation of another embodiment of the invention, a part being broken away to reveal underlying structure.

The embodiment of the invention shown in Fig. 4 is essentially similar to that previously described, but is of simpler, lighter, and cheaper construction. The hack saw shown in Fig. 4 comprises a frame 48 in the form of a heavy metal bar or rod that is obliquely bent at its forward end to provide a nose portion 49. The latter is flattened and provided with a laterally projecting stud 50 constituting an anchorage for one end of a hack saw blade 51. At the rear end of the frame 48 is a fixture 52 that is somewhat similar to the hand guard 31 of the previously described embodiment and has functions similar to said hand guard. The fixture 52 consists of a generally U-shaped strap that is permanently secured at its upper ends to the frame 48 so as to provide a relatively narrow, closed end slot 53 between the opposite sides or legs thereof, which slot is in the plane of the frame. The front and rear margins of the fixture 52 are parallel and arcuate, being generated about a common axis located in space beyond the stud 50 of the nose portion 49 of the frame. The arrangement is such that the respective front and rear margins of the fixture 52 are slightly nearer to the stud 50 at the lower end of slot 53 than they are at the upper end of said slot adjacent frame member 48.

Received in the slot 53 is a threaded stem 55 that is flatted on opposite sides throughout its length, the flatted surfaces being in contact with opposite sides of the slot 53 and preventing the stem from turning on its own longitudinal axis. The stem 55 projects from front and rear of the slot 53, and at its front end carries a laterally projecting stud 56 that constitutes an anchorage for the rear end of the blade 51. A handle 57 is threaded onto the projecting rear end of the stem 55, said handle abutting the rear margin of the fixture 52. A lock nut 58 threaded onto the projecting front end portion of stem 55 preferably is provided, said lock nut being set up against the front margin of fixture 52.

The arrangement is similar to that described with relation to Figs. 1 to 3. The blade 51 may be adjusted from the position shown in Fig. 4 to a position adjacent to and substantially parallel with frame 48, and to any position intermediate thereto. Such adjustment is effected simply by loosening the handle 57 and lock nut 58 on the stem 55, adjusting the position of the latter, and then re-tightening said handle and lock nut. Thereafter, when operating pressure against the cutting edge of the blade urges the stem 55 toward the frame 48 while said blade pivots about stud 50, the handle 57 and lock nut 58 will be more tightly wedged or jammed against the opposite margins of the fixture 52 and movement thereof resisted, which phenomenon results from the fact that the front and rear margins of the fixture recede from the stud 50 in the direction approaching the frame 48.

The use of the lock nut 58 is not essential to the operation of the embodiment of the invention shown in Fig. 4, and its use merely supplements the wedging effect of the handle 57. However, in those cases where the handle is not a symmetrical structure, for example, a handle of "pistol grip" shape, it may not be possible to tighten the handle on the stem 55 to maximum extent since the shape of the handle would require it to be determinately disposed with relation to the frame and blade. Under such conditions the lock nut 58 alone will prevent movement of the stem 58 upwardly in the slot.

Other modification may be resorted to without departing from the spirit of the invention or the scope thereof as defined by the appended claims.

What is claimed is:

1. In a hack saw of the character described, the combination of a frame including means at the front end thereof for anchoring one end of a hack saw blade, and means at the rear end of said frame for anchoring the other end of said blade, said last mentioned means comprising a threaded stem to one end of which the blade is connected, a guide structure secured to said frame and projecting therefrom in which said stem is adjustably positioned, and a nut threaded onto said stem, said guide structure having an arcuate surface against which said nut abuts when tightened, which arcuate surface is generated about an axis that is located beyond the front blade-anchoring means, whereby pressure on the blade that urges the same angularly about its front anchorage and toward the frame will wedge said nut against said arcuate surface.

2. A combination as defined in claim 1 whereof the front blade-anchoring means is located on an arm, including means for positioning said arm alternatively in parallelism with said frame, and at an angle thereto, said arm being carried by said frame.

3. In a hack saw of the character described, the combination of frame including means at the front end thereof for anchoring one end of a hack saw blade, a handle structure attached to the opposite end of the frame, said handle structure comprising a rearwardly positioned handgrip portion and a hand-guard portion in front of the same, the latter portion comprising a pair of parallel spaced apart metal plates, a threaded stem disposed between said plates and engaged, at its forward end, with the hack saw blade, aligned arcuate slots in the respective plates of the hand-guard structure, and a nut threaded onto said stem, said nut disposed in said slots and bearing against the front margins thereof, said margins being nearer the front blade-anchorage at their ends remote from the frame than at their ends adjacent the frame.

4. A combination as defined in claim 3 whereof the stem is formed with flat surfaces that engage the respective plates of the hand-guard structure to prevent turning of the stem on its longitudinal axis.

5. In a hack saw the combination of a frame including means at the front end thereof for anchoring one end of a hack saw blade, a fixture mounted upon the opposite end of the frame and projecting therefrom at an angle thereto, said fixture comprising a pair of parallel, spaced apart metal plates disposed parallel to said frame, the front and rear margins of said plates being arcuate about an axis located forwardly of the front blade-anchoring means, a threaded stem disposed between said fixture plates and connected at its front end to the hack saw blade, and a handle threaded onto the rear end of said stem and bearing against the rear arcuate margins of the said fixture.

6. A combination as defined in claim 5 including a nut on the threaded stem bearing against the front arcuate margin of the fixture.

JERRY M. LEATHERMAN.

REFERENCES CITED

The following references are of record in the file of this patent:

UNITED STATES PATENTS

| Number | Name | Date |
| --- | --- | --- |
| 1,060,312 | Bradley | Apr. 29, 1913 |
| 1,190,477 | Sprague | July 11, 1916 |
| 1,245,545 | Williams | Nov. 6, 1917 |
| 1,429,195 | Donaldson | Sept. 12, 1922 |
| 1,470,897 | Voltz | Oct. 16, 1923 |
| 2,173,365 | Kessler | Sept. 19, 1939 |